(12) United States Patent
Nurmi

(10) Patent No.: US 7,453,446 B2
(45) Date of Patent: Nov. 18, 2008

(54) BUTTONS DESIGNED FOR VERSATILE USE

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 588 days.

(21) Appl. No.: 10/922,330

(22) Filed: Aug. 20, 2004

(65) Prior Publication Data

US 2006/0038773 A1 Feb. 23, 2006

(51) Int. Cl.
  *G06F 3/033* (2006.01)
  *G06F 3/02* (2006.01)
  *G09G 5/00* (2006.01)

(52) U.S. Cl. ............... 345/179; 345/156; 345/168

(58) Field of Classification Search ............... 345/168, 345/169, 156, 179; 200/341; 379/370; 341/22
See application file for complete search history.

(56) References Cited

U.S. PATENT DOCUMENTS

| | | | |
|---|---|---|---|
| 2,771,521 A * | 11/1956 | Cressman et al. ........ 200/43.05 |
| 3,581,022 A * | 5/1971 | Shigetomi et al. ............ 360/60 |
| 3,676,750 A * | 7/1972 | Hawks ....................... 361/686 |
| 3,831,081 A * | 8/1974 | Weiss ......................... 323/349 |
| 3,968,640 A * | 7/1976 | Clemmer et al. .............. 368/69 |
| 4,544,815 A * | 10/1985 | Portmann ................ 200/50.32 |
| 4,659,881 A * | 4/1987 | Dowe ........................ 200/5 R |
| 5,146,615 A * | 9/1992 | Hodsdon et al. ........... 455/90.3 |
| 5,334,976 A * | 8/1994 | Wang .......................... 341/22 |
| 5,598,469 A * | 1/1997 | Preker ................... 379/433.07 |
| 5,623,551 A * | 4/1997 | East et al. .................... 381/119 |
| 5,900,829 A * | 5/1999 | Gardner et al. ............... 341/26 |
| 6,507,336 B1 * | 1/2003 | Lunsford .................... 345/168 |
| 6,931,125 B2 * | 8/2005 | Smallwood ........... 379/433.07 |
| 6,940,490 B1 * | 9/2005 | Kim et al. .................... 345/168 |
| 7,094,979 B2 * | 8/2006 | Kurokawa et al. .......... 200/5 R |
| 7,189,932 B2 * | 3/2007 | Kim ........................... 200/5 R |
| 7,221,360 B2 * | 5/2007 | Defuans et al. ............. 345/179 |
| 2001/0013862 A1* | 8/2001 | Cauwet et al. .............. 345/179 |
| 2004/0239633 A1* | 12/2004 | Kogoh et al. ................ 345/168 |

* cited by examiner

*Primary Examiner*—Robert R. Rainey
(74) *Attorney, Agent, or Firm*—Foley & Lardner LLP

(57) ABSTRACT

A system and method for providing an electronic device with a plurality of buttons thereon that can be actuated by a user using either the user's fingers or a stylus, for example. The buttons include a first portion and a second portion with the first portion of the buttons being separately actuable from the second portion of the buttons. This permits different functions to be performed by the button depending upon whether the first portion or the second portion of the button is actuated.

29 Claims, 3 Drawing Sheets

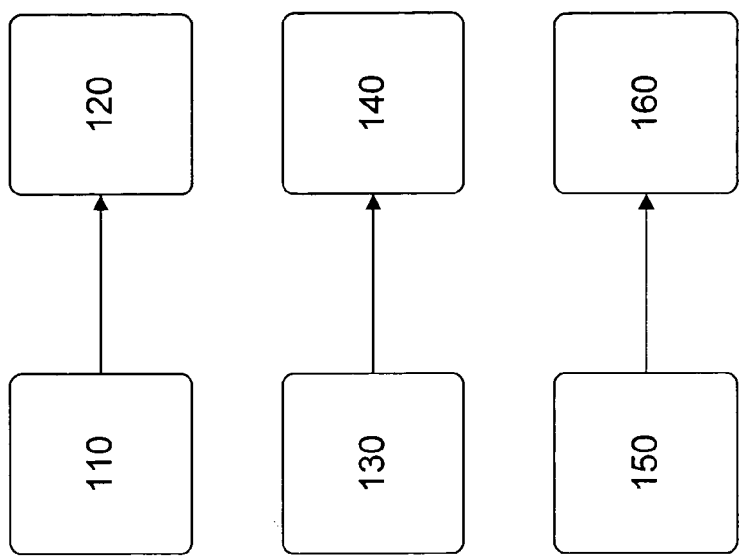
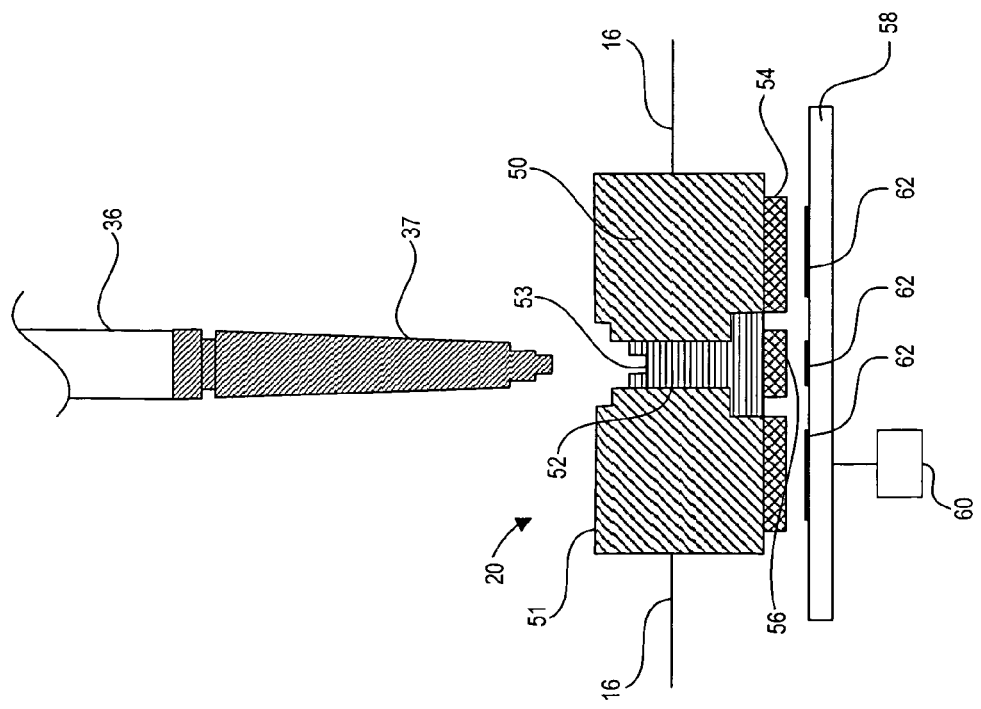

BUTTONS DESIGNED FOR VERSATILE USE

FIELD OF THE INVENTION

The present invention relates generally to the field of portable electronic devices. More particularly, the present invention relates to the field of portable electronic devices including both a stylus and a plurality of buttons

BACKGROUND OF THE INVENTION

A variety of portable electronic devices are widely available for both personal and business use. For example, there are a wide variety of types of cellular phones, portable radio communications devices, personal digital assistants (PDA's), portable computers, and combinations thereof currently on the market. These devices provide a wide range of services, ranging from Internet access to electronic mail to personal organization systems, to even various electronic games.

A persistent issue in these types of portable electronic devices relates to the increasing complexity of the devices themselves. With more and more features continuously being incorporated into the devices, there is a constantly increasing need to provide more methods of inputting information into the devices. At the same time, the devices themselves have become smaller and smaller as both technological advances have been made and as users have demanded more portable and easily-storable devices. This inherent conflict between the smaller devices and the need for more input mechanisms has been difficult to solve.

In devices such as personal digital assistants and miniature computers, a touch-sensitive screen is often included such that the user can use a stylus to directly manipulate icons, numbers or text on the screen. At the same time, these devices also usually include a number of standard hardware buttons that are manipulated to perform various functions.

In most cases, the touch-sensitive screen is manipulated strictly with a stylus, while the buttons are manipulated with a user's finger. Using the touch-sensitive screen and buttons at the same time is often difficult for a user, especially when the device is held in one hand during use.

In conventional portable electronic devices, the buttons are specifically designed for use with a user's fingers and are unsuitable for actuation by a stylus. In fact, it can be practically impossible to press buttons with a stylus in many cases, since the surface of the button is often smooth and slippery, and the buttons are often designed such that they must be pressed relatively hard to be actuated so as to prevent accidental actuations.

In response to this issue, systems have been developed that include buttons having a concave shape that is intended to prevent the stylus from slipping off of the button. Although reasonably useful, this modification fails to address the larger issue of the limited amount of space on such portable electronic devices, particularly in light of the constantly increasing number of features that are being incorporated into such devices.

It would therefore be desirable to develop a system that allows a user to easily interact the stylus with the buttons on a portable electronic device while at the same time providing the user with additional mechanisms for inputting information into the portable electronic device.

SUMMARY OF THE INVENTION

The present invention relates to a system, method, device and computer code product for providing an electronic device with a plurality of buttons thereon that can be actuated by a user using either the user's fingers or a stylus, for example. The buttons may be constructed in many different ways. For example, the buttons may include a first portion and a second portion, with the first portion being depressed relative the second portion and specifically sized such that, when the stylus is contacting the inner portion, it will not slip off of the respective button. Additionally, the first portion of the buttons may be separately actuable from the second portion of the buttons. This permits different functions to be performed by the button depending upon whether the first portion of the button, which may be actuated by a stylus, or the second portion of the button, which may be actuated by a user's fingers, for example.

The system and method of the present invention aids the user in the operation of the portable electronic device, as the user is capable of using the stylus to manipulate the buttons, while at the same time providing additional input mechanisms on the portable electronic device without increasing the size of the device.

BRIEF DESCRIPTION OF THE DRAWINGS

FIG. 5 is a sectional side view of a single button and associated components constructed in accordance with one embodiment of the present invention; and FIG. 6 is a flow diagram showing the signals that are transmitted based upon which portions of an input button are actuated in a device constructed according to the principles of the present invention.

DETAILED DESCRIPTION OF THE INVENTION

Figure 1:
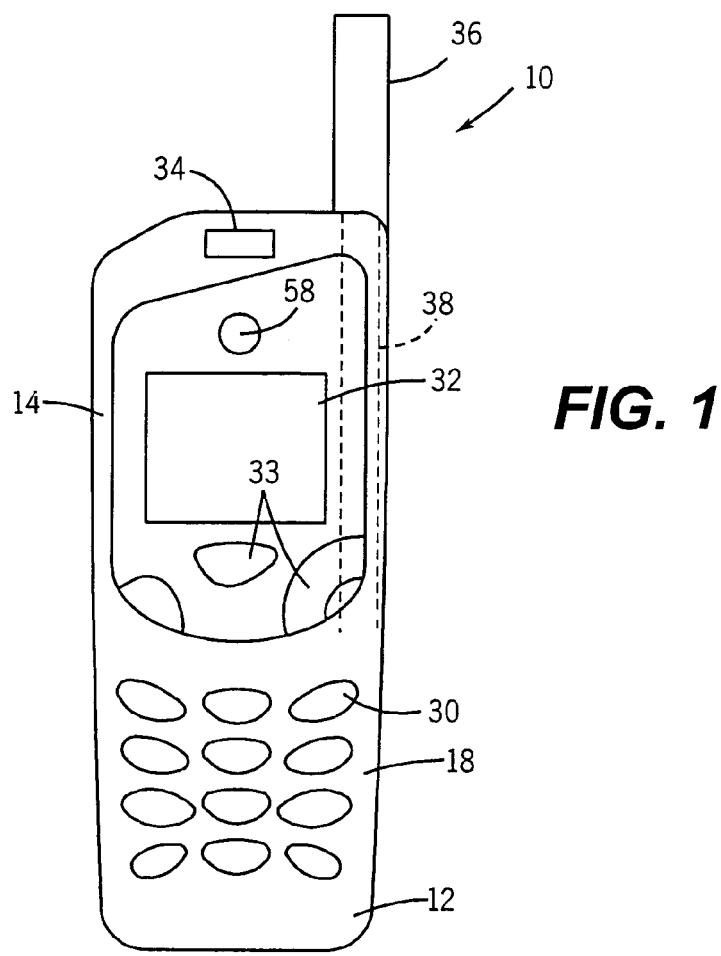
FIG. 1 shows a front view of the outer casing of a portable electronic device constructed according to one embodiment of the present invention.
Figure 2:
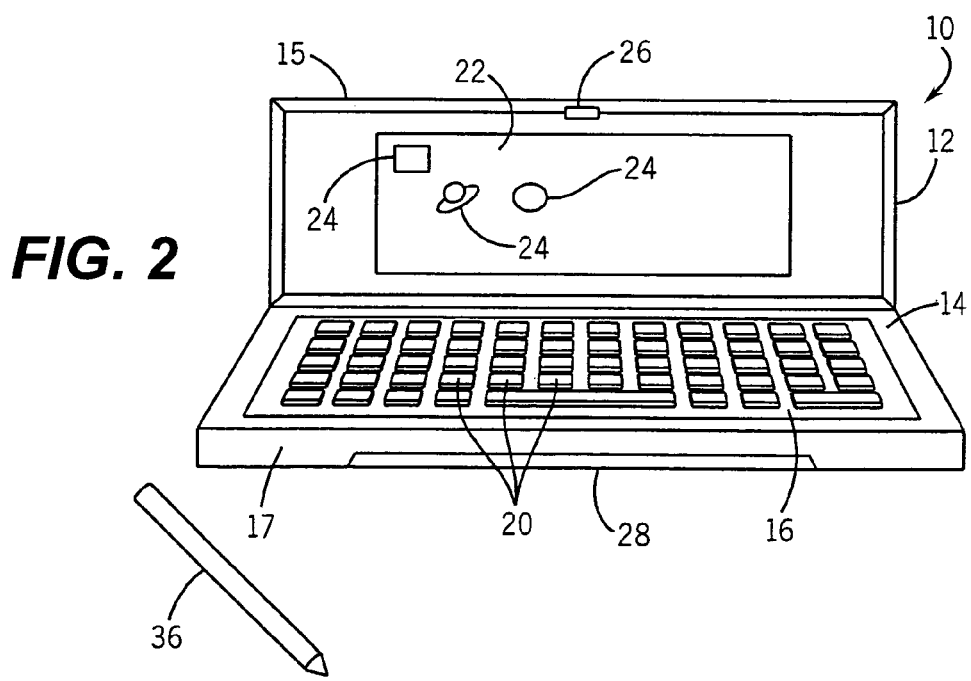
FIG. 2 is a view showing the inside of the portable electronic device of FIG. 1 when in the open position.

FIGS. 1 and 2 show the structure of a portable electronic device 10 constructed in accordance with the principles of the present invention. The foldable, portable electronic device 10, in one embodiment of the invention, is a combination of a cellular telephone, hand-held computer, and a personal digital assistant. The foldable, portable electronic device 10 can include features such as including data and Internet connectivity, word processors, spreadsheets, presentation editors, viewers and a variety of office tools, as well as various security features and also items such as a VGA camera, video recorder and other items. However, the principles of the present invention can be applied to a wide variety of electronic devices including, but not limited to, a personal digital assistant without an attached telephone, a personal computer, a personal notebook, and other devices.

The foldable, portable electronic device 10 includes a housing 12 that is foldable along a hinge element 14. The housing 12 includes a housing inner portion 16 and a housing outer portion 18, as well as a housing upper portion 15 and a housing lower portion 17. As shown in FIG. 2, the housing inner portion 16 may include items such as keyboard keys or buttons 20, as well as a touch-sensitive display 22. The touch-sensitive display 22 can display various icons 24, as well as text, numbers, images, and other items. The housing inner portion 16 also preferably includes male and female latching members 26 and 28 that are used to keep the portable electronic device 10 in a closed position, when items found in the housing inner portion 16 are not in use. However, a wide variety of mechanisms besides male and female latching members 26 and 28 may also be used. For example, it is also possible to include a magnetic system for keeping the housing upper portion 15 and the housing lower portion 17 engaged with each other.

As shown in FIG. 1, the housing outer portion 18, in one embodiment of the invention, comprises a telephone system which includes a plurality of telephone keys 30 and a display screen 32. The display screen 32 can either be strictly for display purposes or can also be touch-sensitive. The outer housing portion 18 also includes a speaker 34 to emit various sounds, as well as the voice of a person during a telephone conversation. A data input device, a stylus 36, for example, fits within a data input device storage region 38. The data input device storage region 38, in one embodiment of the invention, comprises a slot inside a portion of the housing 12. It is also possible, however, that the data input device storage region 38 could take the form of a securing mechanism on the outside of the housing 12 against which the stylus 36 could be secured using one of a variety of methods known in the art.

As shown in FIG. 2, the stylus 36 is used to manipulate items on the touch-sensitive display 22. In particular, the stylus 36 can be used to actuate icons 24 on the touch-sensitive display 22 in order to initiate various commands, open computer programs, and perform other functions. It is also possible for the stylus 36 to interact with the touch-sensitive display 22 to perform functions such as dragging items across the touch-sensitive display 22, edit text, enlarge or resize objects, and perform many functions that are similar to those that a user can perform using a mouse with a personal computer.

Figure 3:
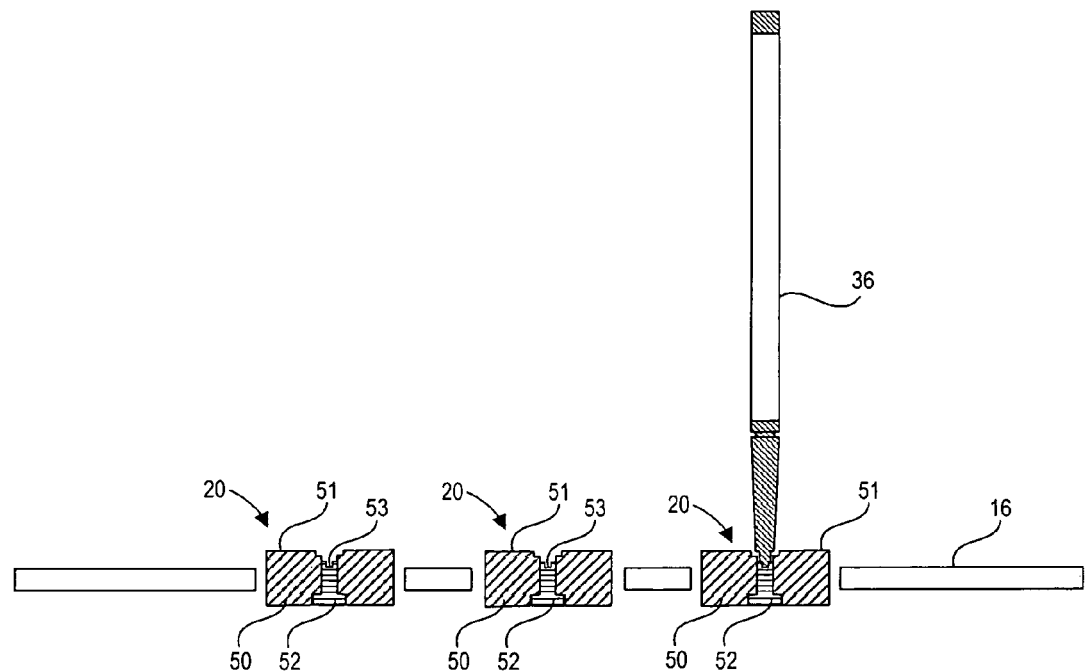
FIG. 3 is a sectional side view of a plurality of buttons on a portable electronic device constructed according to one embodiment of the present invention.
Figure 4:
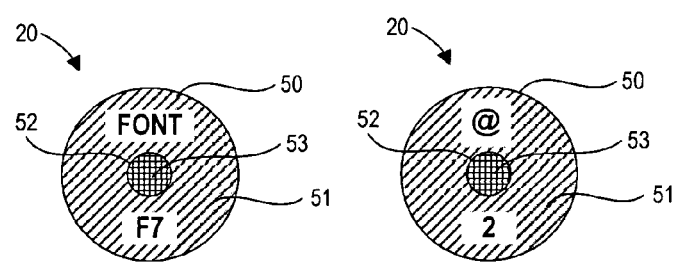
FIG. 4 is a top view of a plurality of buttons on a portable electronic device according to one embodiment of the present invention.

FIGS. 3 and 4 show a plurality of buttons 20 constructed according to one embodiment of the present invention. A button 20 constructed in accordance with this embodiment comprises a button outer portion 50 and a button inner portion 52. Each button outer portion 50 includes a button outer portion surface 51. The button outer portion surface 51 is sized such that a user can contact the button outer portion surface 51 with his or her finger in order to actuate the button outer portion 50. The button inner portion 52 similarly includes a button inner portion surface 53. The button inner portion surface 53 is specifically designed and positioned so that a user can use a fine tip 37 of the stylus 36 to actuate the button inner portion 52. Additionally, the button inner portion surface 53 may be so narrow as to prevent its actuation by a user's finger.

The button inner portion surface 53, in one embodiment of the invention, is slightly depressed relative to the button outer portion surface 51. By having the button inner portion surface 53 slightly depressed, the stylus 36 is less likely to slide off of the button inner portion surface 53 when the user is attempting to actuate the button inner portion 53. In one embodiment of the invention, the button inner portion surface 53 is shaped to essentially "trap" the fine tip within the button inner portion 52 in order to prevent inadvertent actuation of the button outer portion 50.

FIG. 5 is a sectional side view showing the structure of a single button 20 and the associated circuitry for a portable electronic device in accordance with one embodiment of the present invention. A wide variety of systems are conventionally known for actuating keys or buttons on a typical keyboard, and all such systems could be incorporated to operate in accordance with the principles of the present invention. Therefore, FIG. 5 represents only one implementation of the invention and should not be so limited.

As shown in FIG. 5, the button 20 includes a button outer portion contact 54 and a button inner portion contact 56. In one embodiment of the invention, the button outer portion contact 54 has an "O" shape such that it does not contact the button inner portion 52, while the button inner portion contact 56 is disc-shaped and is positioned so as to not come into contact with the button outer portion 50. Both the button inner portion contact 56 and the button outer portion contact 54 may be constructed of a conductive material such as carbon.

Immediately below the button inner portion contact 56 and the button outer portion contact 54 is a key matrix 58, which is operatively connected to a processor 60 for the portable electronic device 10. The key matrix 58 includes a plurality of contact points 62 dispersed throughout, with the contact points 62 being positioned below button outer portion contacts 54, button inner portion contacts 56 and, for any buttons 20 that are not constructed in accordance with the principles of the present invention, generally below the buttons 20. Like the button outer portion contact 54 and the button inner portion contact 56, the contact points 62 are also conductive.

As shown in FIG. 4, actuation of a button outer portion 50 results in the entering of one type of information, while actuation of a button inner portion 52 on the same button 20 results in the entering of an entirely separate type of information. For example, actuation of the button outer portion 50 of the buttons 20 in FIG. 4 results in the entering of either the "F7" function or the number "2", while the actuation of the button inner portion 52 on the same buttons 20 results in either activating a "font" feature or the entering of the "@" symbol. This is accomplished in this particular embodiment of the invention by the following steps.

When a user desires to enter the "@" symbol, for example, the user uses the stylus 36 to actuate the button 20 including this symbol at the button inner portion 52 by contacting the stylus 36 with the button inner portion surface 53. Pushing the button inner portion 52 forces the button inner portion contact 56 downward until it comes into contact with its respective contact point 62, resulting in the completion of a circuit for that particular portion of the key matrix 58. As a result of this circuit completion, a signal is subsequently sent to the processor 60 to process the user's desired command, which results in the "@" symbol being displayed.

When a user desires to enter the number "2", for example, the user simply uses his or her finger to actuate the button 20 including this number. As the button inner portion 52 is too small to be actuated by a human finger, the user's finger comes into contact with the button outer portion 50. Pushing the button outer portion 50 forces the button outer portion contact 54 downward until it comes into contact with its respective contact point 62, resulting in the completion of a circuit for that particular portion of the key matrix 58. As a result of this circuit completion, a signal is subsequently sent to the processor 60 to process the user's desired command, which results in the numeral "2" being displayed.

In the embodiment shown in FIG. 5, the actuation of the button outer portion 50 will also force the button inner portion 52 downward, causing the button inner portion contact 56 against its respective contact. In this situation, the portable electronic device 10 may be programmed such that, when both the button outer portion contact 54 and the button inner portion contact 56 simultaneously complete their respective circuits, the processor 60 should execute programming such that the function corresponding to the button outer portion 50 is processed. In an alternative embodiment of the invention, however, the button 20 could be constructed such that the actuation of the button outer portion 50 does not necessarily carry the button inner portion 52 as well. In either event, a software program can be used to determine which characters should be displayed and/or which functions should be performed depending upon which part of a button 20 is actuated.

In one embodiment of the invention, the substantially simultaneous actuation of the button outer portion 50 and the button inner portion 52 downward causes the processor 60 to execute programming such that a third function is processed that is different from both functions corresponding to the button outer portion 50 and the button inner portion 52. For example and as represented in FIG. 6, actuation of the button outer portion 50 with a user's finger at step 110 could result in a first function, represented at 120. Actuation of the button inner portion 52 with a stylus 36 at step 130 results in a second function, represented at 140. The action of the button outer portion 50 with user's finger that also causes the button inner portion 52 to move downward, represented at 150 results in a third function according to one embodiment of the invention, represented at 160. This could also be accomplished in a substantially opposite manner, with the button inner portion 52 being actuated while also forcing downward the button outer portion 50.

It should also be noted that the functions described above do not necessarily have to be the same at all times. Instead, each individual function can be altered for use with a particular program for example. In one embodiment of the invention, for example, substantially simultaneous actuation of the button inner portion 52 and the button outer portion 50 could result in a "search" function for one program, while substantially simultaneous action of the same button inner portion 52 and button outer portion 50 in another program could result in a "zoom" function. Similar functionality can also be applied to actuation of the button inner portion 52 and the button outer portion 50 separately.

In addition to the above, it is also possible for the first and second functions identified above to be related to each other, with a final function being dependent upon the portion of the button 20 that is actuated. For example, in one embodiment of the present invention, actuation of the button inner portion 52 results in the display of a lower-case letter, while actuation of the button outer portion 50 results in the display of the same letter but in an upper case.

In one embodiment of the invention, the button inner portion 52 and the button outer portion 50 are separate structural components, which enables one of the button inner portion 52 and the button outer portion 50 to move with corresponding movement by the other. In an alternate embodiment of the invention, however, the button inner portion 52 and the button outer portion could be combined into a single unit having different capabilities to perform depending upon the relative pressures and location of pressures exerted on the button 20.

The present invention can be used with a variety of types of keyboard keys. For example, a button 20 constructed in accordance with the principles of the present invention can be used with virtually any type of keyboard system that relies upon the use of conductive materials beneath or on the underside of the buttons 20 to complete a circuit in order to enter a command. Additionally, buttons 20 constructed according the principles of the present invention could also be used with capacitive switches, where the processor 60 detects any change in currents between a plate on a button 20 and a corresponding plate below. Other mechanisms known in the art could also be used.

The present invention can be used in conjunction with a wide variety of devices, including but not limited to PDA's, portable telephones, small personal computers, and other portable and nonportable electronic devices. Regardless the type of device in which the present invention is incorporated, the invention greatly reduces the problem of having both a large number of functions incorporated into device while having a very small amount of space with which to work. Furthermore, the present invention essentially replaces the need for a function key such as "shift", "alt" or "ctrl" on some devices, as a user only needs to actuate part of a single key to enter a second, independent command.

While some embodiments have been shown and described herein, it should be understood that changes and modifications can be made to the invention without departing from the invention in its broader aspects. Various features of the invention are defined in the following Claims.

What is claimed is:

1. A device for inputting and processing information, comprising:
   a plurality of input buttons operatively connected to a processor, and
   at least one of the plurality of input buttons including:
      an input button first portion; and
      an input button second portion,
   wherein actuation of the input button first portion causes a first signal to be transmitted to the processor, wherein actuation of the input button second portion causes a second signal to be transmitted to the processor, wherein the input button first portion is configured so as not to be actuable by a user's finger without also actuating the input button second portion, and wherein the input button first portion is configured to be actuable by a stylus without also actuating the input button second portion.

2. The device of claim 1, wherein the first signal is different from the second signal.

3. The device of claim 1, wherein actuation of the input button first portion and the input button second portion causes a third signal to be transmitted to the processor.

4. The device of claim 1, further comprising a key matrix positioned adjacent to the plurality of input buttons, the key matrix including a plurality of contact points effectively positioned with respect to the plurality of input buttons.

5. The device of claim 4, wherein the input button first portion includes a first conductive mass on a side thereof substantially opposite an input button first portion contact surface, the first conductive mass interacting with one of the plurality of contact points when the input button first portion contact surface is actuated to cause the first signal to be transmitted to the processor.

6. The device of claim 5, wherein the input button second portion includes a second conductive mass on a side thereof substantially opposite an input button second portion contact surface, the second conductive mass interacting with one of the plurality of contact points when the input button second portion contact surface is actuated to cause the second signal to be transmitted to the processor.

7. The device of claim 6, wherein the first and second conductive masses comprise carbon.

8. The device of claim 1, wherein the input button first portion includes an input button first portion contact surface having a first elevation, and wherein the input button second portion includes an input button second portion contact surface having a second elevation higher than the first elevation.

9. The device of claim 8, wherein the input button first portion contact surface includes a depression therein sized to accept a stylus.

10. The device of claim 1, wherein the input button second portion substantially surrounds the input button first portion.

11. A system for completing actions into a device using a single input button, comprising:
a processor;
an input button first portion operatively connected to a processor; and
an input button second portion operatively connected to the processor,
wherein actuation of the input button first portion causes a first signal to be transmitted to the processor, wherein actuation of the input button second portion causes a second signal to be transmitted to the processor, wherein the input button first portion is configured so as not to be actuable by a user's finger without also actuating the input button second portion, and wherein the input button first portion is configured to be actuable by a stylus without also actuating the input button second portion.

12. The system of claim 11, wherein the first signal is different from the second signal.

13. The system of claim 11, wherein simultaneous actuation of the input button first portion and the input button second portion causes a third signal to be transmitted to the processor.

14. The system of claim 11, further comprising a key matrix positioned adjacent to the plurality of input buttons, the key matrix including a plurality of contact points effectively positioned with respect to the plurality of input buttons.

15. The system of claim 14, wherein the input button first portion includes a first conductive mass on a side thereof substantially opposite the input button first portion, the first conductive mass interacting with one of the plurality of contact points when the input button first portion is actuated to cause the first signal to be transmitted to the processor.

16. The system of claim 15, wherein the input button second portion includes a second conductive mass on a side thereof substantially opposite the input button second portion, the second conductive mass interacting with one of the plurality of contact points when the input button second portion is actuated to cause the second signal to be transmitted to the processor.

17. The system of claim 16, wherein the first and second conductive masses comprise carbon.

18. The system of claim 11, wherein the input button first portion has a first elevation and the input button second portion has a second elevation higher than the first elevation.

19. The system of claim 11, wherein the input button first portion includes a depression therein sized to accept a stylus.

20. The system of claim 11, wherein the input button second portion substantially surrounds the input button first portion.

21. A method of completing actions with a device using a single input button, comprising:
providing an input button operatively connected to a processor, the input button including:
an input button first portion operatively connected to a processor; and
an input button second portion operatively connected to the processor,
actuating the input button first portion to transmit a first signal to the processor; and
actuating the input button second portion to transmit a second signal to the processor,
wherein the input button first portion is configured so as not to be actuable by a user's finger without also actuating the input button second portion, and wherein the input button first portion is configured to be actuable by a stylus without also actuating the input button second portion.

22. The method of claim 21, wherein the first signal is different from the second signal.

23. The method of claim 21, wherein simultaneous actuation of the input button first portion and the input button second portion causes a third signal to be transmitted to the processor.

24. The method of claim 21, wherein the input button first portion includes an input button first portion contact surface having a first elevation, and wherein the input button second portion includes an input button second portion contact surface having a second elevation different than the first elevation.

25. The method of claim 24, wherein the input button first portion contact surface includes a depression therein sized to accept a stylus.

26. The method of claim 21, wherein the input button second portion substantially surrounds the input button first portion.

27. A device, comprising:
an input button; and
a computer program product, embodied in a computer-readable medium, including:
software code for processing a first signal from a first portion of the input button;
software code for processing a second signal from a second portion of the input button;
software code for executing a first instruction based upon the first signal; and
software code for executing a second instruction based upon the second signal,
wherein the first portion of the input button is configured so as not to be actuable by a user's finger without also actuating the second portion of the input button, and wherein the first portion of the input button is configured to be actuable by a stylus without also actuating second portion of the input button.

28. The device of claim 27, wherein the first signal is different from the second signal.

29. The device of claim 27, further comprising software code for executing a third instruction based upon a combination of the first signal and the second signal.

* * * * *

UNITED STATES PATENT AND TRADEMARK OFFICE
CERTIFICATE OF CORRECTION

PATENT NO.        : 7,453,446 B2                                     Page 1 of 1
APPLICATION NO. : 10/922330
DATED             : November 18, 2008
INVENTOR(S)      : Mikko Nurmi It is certified that error appears in the above-identified patent and that said Letters Patent is hereby corrected as shown below:

<u>Title Page</u>

Primary Examiner "Robert R. Rainey" should be changed to read --Alexander Eisen--.
Below the Primary Examiner, insert --Assistant Examiner-Robert R. Rainey--.

Signed and Sealed this

Twenty-third Day of June, 2009

JOHN DOLL
*Acting Director of the United States Patent and Trademark Office*